No. 828,648. PATENTED AUG. 14, 1906.
L. T. GIBBS.
REVERSIBLE DRIVING GEAR.
APPLICATION FILED AUG. 2, 1905.
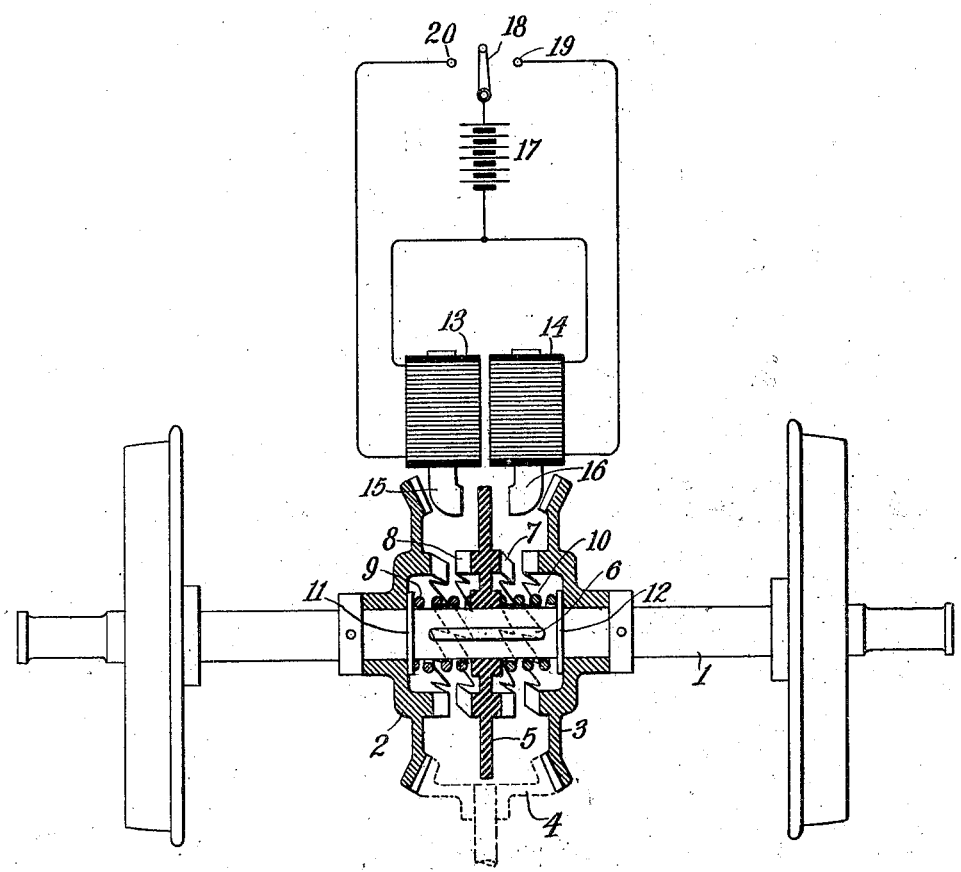

UNITED STATES PATENT OFFICE.

LUCIUS T. GIBBS, OF HEMPSTEAD, NEW YORK.

REVERSIBLE DRIVING-GEAR.

No. 828,648.  Specification of Letters Patent.  Patented Aug. 14, 1906.

Application filed August 2, 1905. Serial No. 272,297.

*To all whom it may concern:*

Be it known that I, LUCIUS T. GIBBS, a citizen of the United States, residing at Hempstead, in the county of Nassau and State of New York, have invented certain new and useful Improvements in Reversible Driving-Gear, of which the following is a specification, reference being had to the drawing accompanying and forming a part of the same.

My invention relates to apparatus for transmitting the power of a prime mover to a load which is to be driven, and has for its chief object to provide a simple and thoroughly efficient apparatus of this character by which the direction of movement of the load may be reversed at will or the load left to move freely and independently of the source of power.

In carrying out my invention in its preferred form I provide on the shaft which is to be driven a pair of driving-gears, mounting the gears in such a manner that they may revolve freely on the shaft. The gears are spaced some distance apart and are constantly in engagement with a gear rotated by the prime mover, so that the driving-gears will be constantly rotated as long as the gear which is in engagement with them is actuated—that is to say, the driving-gears can rotate freely on the shaft without affecting the latter, and, conversely, the shaft may rotate freely without affecting the driving-gears carried thereby. Between the driving-gears is a clutch device—as, for example, a disk—mounted on the shaft and rotatable therewith, but free to move longitudinally thereon into engagement with one or the other of the driving-gears, as may be desired. Since the latter gears by reason of their engagement with a common power-gear are driven in opposite directions, the shaft will be driven in one direction if the clutch device be brought into engagement with one of the rotating driving-gears and in the other direction if the clutch device be brought into engagement with the other driving-gear. Furthermore, if the clutch device is held out of engagement with both driving-gears rotation of the latter will have no effect on the shaft, nor will the shaft if rotated by other means have any effect on the driving-gears or on the prime mover connected therewith.

Referring now to the accompanying drawing for a more detailed explanation of my invention, the shaft which represents the load to be driven is indicated by 1. In the present instance the shaft is the driving-axle of a vehicle—as, for example, a railway-car—but it is to be understood, of course, that the invention is not limited for use in the propulsion of vehicles, but is applicable to the driving of machinery generally. Near the center of the shaft and adapted to revolve freely thereon are the driving-gears 2 3 of the bevel type and having their teeth inwardly disposed or toward each other, so that both may be engaged and rotated by a common power-gear, (shown in dotted lines at 4.) It is evident, of course, that the gears 2 3, being both driven by the same power-gear 4, revolve in opposite directions and that the axle will revolve in one direction or the other, according as it is connected with one gear or the other.

For the purpose of connecting the axle with either gear at will the clutch device 5 is provided. In the preferred form of the invention, as herein illustrated, this device consists of a disk mounted to slide longitudinally on the axle 1, but prevented from rotating thereon by means of a feather 6. On the sides of the disk are teeth 7 8 of the ratchet type, the teeth 8 being inclined in one direction, while the teeth 7 are inclined in the other. Each driving-gear is provided on its inner face with a series of teeth corresponding with its adjacent series on the disk 5, so that the disk will lock with either gear at will. If the disk be carried over toward the gear 2 until the two series of teeth engage each other, it is clear that the disk will rotate with the gear, and the disk being non-rotatably connected with the axle 1 the latter must rotate with the disk—that is, in the same direction as the gear 2. On the other hand, bringing the disk 5 over into engagement with the gear 3 will reverse the rotation of the disk, and likewise the movement of the axle.

For the purpose of holding the disk normally out of engagement with both gears—as, for example, about midway between the two—the expansible coil-springs 9 and 10 are provided, bearing on opposite sides of the disk 5 and against collars 11 and 12, respectively on the axle 1. The springs being of substantially equal strength, the disk will be held about midway between the gears, as will be readily understood.

Any suitable means may be employed to shift the clutch-disk 5 to one side or the other against the tension of the opposing spring and into engagement with the desired driving-disk; but I prefer to employ electromagnetic devices—as, for example, of the type shown in the drawing. 13 14 are two electromagnets having their poles 15 16, respectively, arranged on opposite sides of the disk 5, so that the latter will respond to the pull of one magnet or the other, according to which one is energized. Each magnet has a circuit of its own through any suitable source of current, as 17. Any convenient circuit-controller may be employed—as, for example, a switch 18—adapted to throw the source of current 17 into one or the other magnet-circuit, as desired. For example, if the switch is thrown over to contact 19 the magnet 14 will be energized and the disk 5 being attracted by the pole 16 will be carried over into engagement with the driving-gear 3, while if the switch is thrown over to contact 20 the magnet 13 will be energized and the clutch-disk carried into engagement with the gear 2.

The operation of the device having been explained in connection with the description of the mechanism, further explanation of its operation is unnecessary. It will be observed, however, that with the clutch-disk occupying its central position out of engagement with both gears, as shown in the drawing, the axle 1 is entirely free from the driving-gears 2 3 and the power-gear 4, and may therefore revolve freely, as is desirable when the vehicle is coasting. It will be observed that the horizontal faces of the teeth on the clutch-disk 5 and the driving-gears 2 3 are not exactly parallel with the shaft, but are inclined slightly toward the other face of the tooth in each case. Hence if the disk 5 be brought ever so slightly into engagement with either set of driving-teeth on the gears 2 3 the effect of the inclined meeting faces will be to draw the disk still closer to the gear until the teeth are seated to the fullest extent.

As already stated, the devices herein specifically shown and described constitute merely the preferred embodiment of my invention, which may be embodied in widely different forms without departure from its proper scope.

What I claim is—

1. The combination of a rotatable shaft, a pair of gears mounted to rotate on the shaft, means for rotating the said gears simultaneously and in opposite directions to each other, means intermediate to the gears and movable longitudinally of the shaft for connecting one or the other with the shaft, electromagnets adjacent to and on opposite sides of the said connecting means to act directly upon the same, and means for energizing either magnet at will independently of the other, whereby the shaft may be driven in either direction, as set forth.

2. The combination of a rotatable shaft, a pair of gears mounted to rotate on the shaft, means for rotating the said gears simultaneously and in opposite directions to each other, a clutch-disk between the gears, rotatable with and movable longitudinally on the shaft, electromagnets on opposite sides of the disk with their poles in position to attract said disk, and means for energizing either magnet independently of the other, whereby the disk may be brought into engagement with either gear at will, as set forth.

3. The combination of a rotatable shaft, a pair of gears mounted to rotate on the shaft, means for rotating the said gears simultaneously and in opposite directions to each other, a clutch-disk between the gears, rotatable with and longitudinally movable on the shaft, means for holding the clutch-disk normally out of engagement with both gears, a pair of electromagnets on opposite sides of the disk in position to shift the same into engagement with either gear, and means for energizing either magnet at will, as set forth.

LUCIUS T. GIBBS.

Witnesses:
M. LAWSON DYER,
JOHN C. KERR.